US006734124B2

(12) United States Patent
Hurst et al.

(10) Patent No.: US 6,734,124 B2
(45) Date of Patent: May 11, 2004

(54) LOW PERMEABILITY AIRBAG CUSHIONS HAVING EXTREMELY LOW SILICONE-BASED COATING LEVELS

(75) Inventors: Michael D. Hurst, LaGrange, GA (US); Edwin Hersey, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/335,828

(22) Filed: Jan. 2, 2003

(65) Prior Publication Data

US 2003/0124929 A1 Jul. 3, 2003

Related U.S. Application Data

(63) Continuation of application No. 09/595,648, filed on Jun. 16, 2000, now Pat. No. 6,569,788.

(51) Int. Cl.[7] ............................................... B32B 27/02
(52) U.S. Cl. .................... 442/168; 103/2; 103/18.12; 280/728.1; 280/743; 383/3; 427/387; 427/389.9; 427/412; 428/36.1; 428/34.5; 428/34.3; 428/34.7; 442/76; 442/158; 442/169
(58) Field of Search .......................... 383/3; 106/2, 18, 106/12; 427/387, 389.9, 412; 428/36.1, 34.5, 34.3, 34.7; 528/31; 442/76, 155, 168, 169, 71, 72; 280/728.1

(56) References Cited

U.S. PATENT DOCUMENTS 6,037,279 A * 3/2000 Brookman et al. ............ 442/71
6,220,309 B1 * 4/2001 Sollars, Jr. ................... 139/389

* cited by examiner

*Primary Examiner*—Arti Singh
(74) *Attorney, Agent, or Firm*—Terry T. Moyer

(57) ABSTRACT

Coated inflatable fabrics and more particularly concerns airbag cushions to which very low add-on amounts of silicone-based coating have been applied and which exhibit extremely low air permeability are provided. The inventive inflatable fabrics are primarily for use in automotive restraint cushions that require low permeability characteristics (such as side curtain airbags). Traditionally, heavy, and thus expensive, coatings of compounds such as neoprene, silicones, and the like, have been utilized to provide such required low permeability. The inventive fabric utilizes an inexpensive, very thin, substantially uniform silicone coating to provide such necessarily low permeability levels. Thus, the inventive coating comprises at least a single layer comprising a majority of silicone-based material, wherein the total thickness of the single layer is at most about 3.0 ounces per square yard as applied to a target fabric surface. The inventive airbag exhibits a characteristically long leak-down rate as compared to other coated airbags.

27 Claims, 2 Drawing Sheets

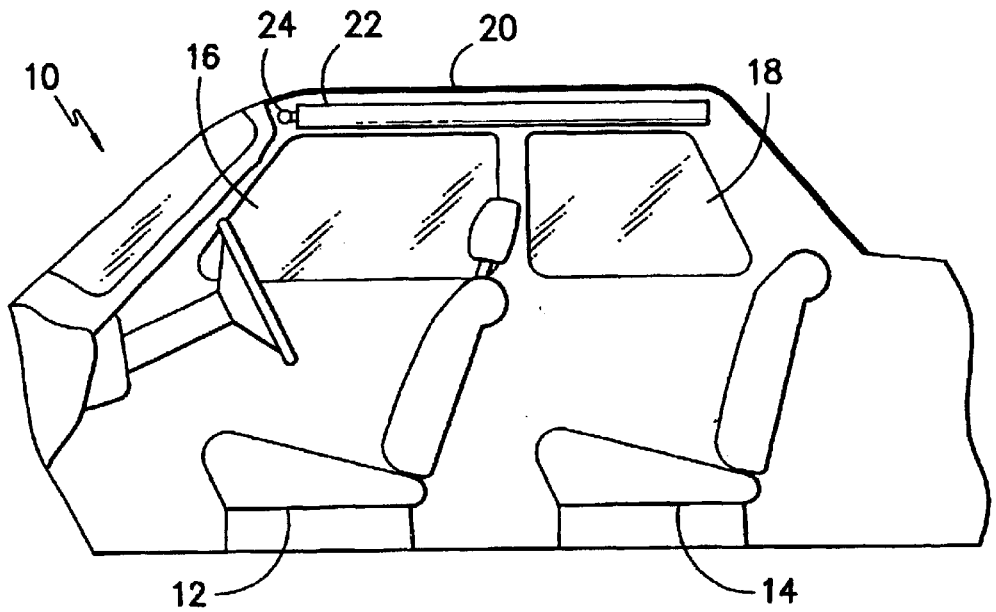
FIG. -1-
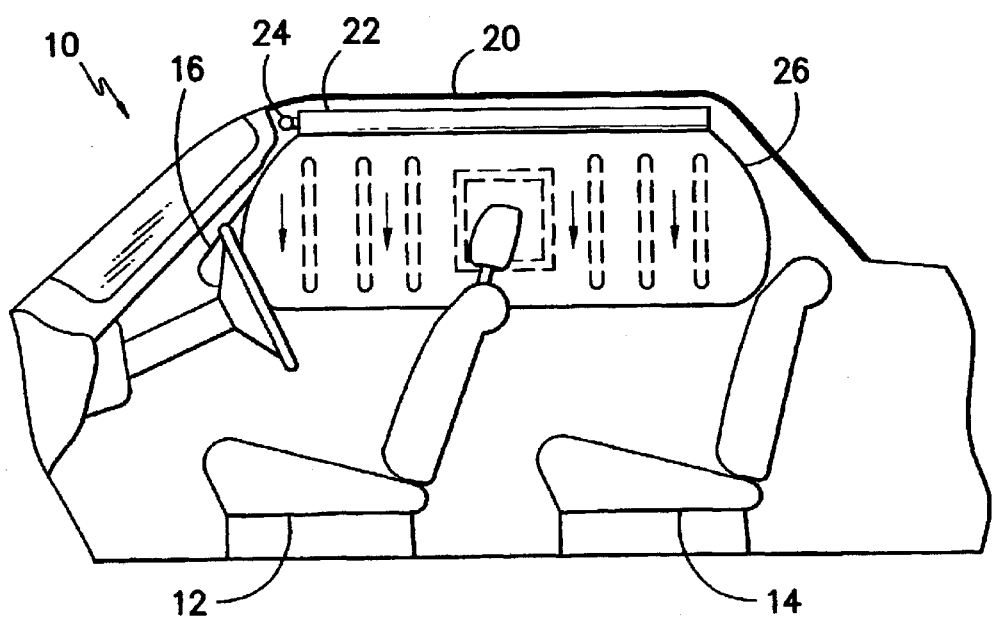
FIG. -2-

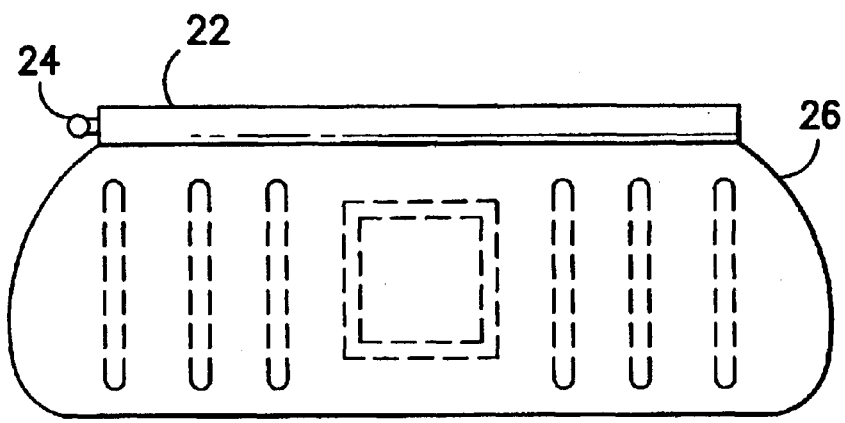
FIG. -3-
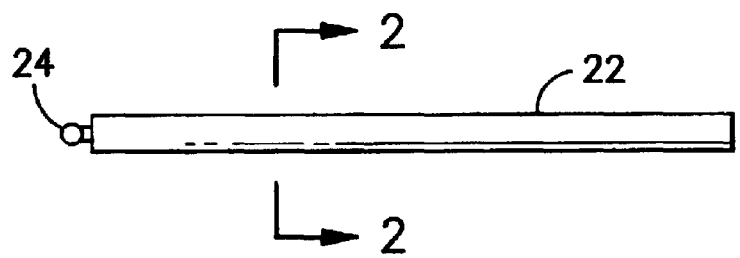
FIG. -4-
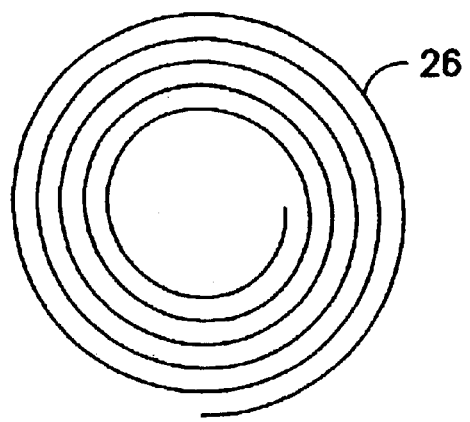
FIG. -5-

LOW PERMEABILITY AIRBAG CUSHIONS HAVING EXTREMELY LOW SILICONE-BASED COATING LEVELS

CROSS REFERENCE TO RELATED APPLICATIONS

This application is a continuation of application Ser. No. 09/595,648, filed on Jun. 16, 2000, now U.S. Pat. No. 6,569,788. This parent application is herein entirely incorporated by reference.

FIELD OF THE INVENTION

This invention relates generally to coated inflatable fabrics and more particularly concerns airbag cushions to which very low add-on amounts of silicone-based coating have been applied and which exhibit extremely low air permeability. The inventive inflatable fabrics are primarily for use in automotive restraint cushions that require low permeability characteristics (such as side curtain airbags). Traditionally, heavy, and thus expensive, coatings of compounds such as neoprene, silicones, and the like, have been utilized to provide such required low permeability. The inventive fabric utilizes an inexpensive, very thin, substantially uniform silicone coating to provide such necessarily low permeability levels. Thus, the inventive coating comprises at least a single layer comprising a majority of silicone-based material, wherein the total thickness of the single layer is at most about 3.0 ounces per square yard as applied to a target fabric surface. The inventive airbag exhibits a characteristically long leak-down rate as compared to other coated airbags.

BACKGROUND OF THE PRIOR ART

Airbags for motor vehicles are known and have been used for a substantial period of time. A typical construction material for airbags has been a polyester or nylon fabric, coated with an elastomer such as neoprene, or silicone. The fabric used in such bags is typically a woven fabric formed from synthetic yarn by practices that are well known in the art.

The coated material has found acceptance because it acts as an impermeable barrier to the inflation medium. This inflation medium is generally a gas generated from a gas generator or inflator. Such gas is conveyed into the cushion at a relatively warm temperature. The coating obstructs the permeation of the fabric by such hot gas, thereby permitting the cushion to rapidly inflate without undue decompression during a collision event.

Airbags may also be formed from uncoated fabric which has been woven in a manner that creates a product possessing low permeability or from fabric that has undergone treatment such as calendaring to reduce permeability. Fabrics which reduce air permeability by calendaring or other mechanical treatments after weaving are disclosed in U.S. Pat. No. 4,921,735; U.S. Pat. No. 4,977,016; and U.S. Pat. No. 5,073,418 (all incorporated herein by reference).

Traditional silicone coatings have proven ineffective at low add-on coating weights over target airbag fabric surfaces for low permeability characteristics. Typically, such coatings have required extremely thick layers of materials to provide the desired low permeability levels required for long-term rollover protection situations (particularly for side-curtain airbags). In general, past silicone-based coatings have utilized non-solvent- and solvent-based compositions having dry coating weights for such silicones above 3 and approaching lower levels of at least 4 ounces per square yard for both the front and back panels of side curtain airbags. As will be appreciated by one of ordinary skill in this art, high add-on weights substantially increase the cost of the base fabric for the airbag and make packing within small airbag modules very difficult. Furthermore, traditionally utilized silicones exhibit very low tensile strength and elongation at break characteristics that do not withstand high pressure inflation easily without the utilization of very thick coatings. However, silicones provide excellent durability, aging, and processability benefits, which, if provided with extremely low add-on compositions, would translate into highly desirable airbag coatings. Additionally, as noted in greater detail below, the production of integrally woven side curtain airbags has eliminated the possibility of coating on both the front and back sides of individual fabric panels. As such, there is a greater need to accord relatively thin coating layers on solely the outside panels (i.e., front) of such articles. To date, the ability to restrict coatings to low levels of silicone-based materials has been unavailable.

The use of certain polyurethanes as coatings as disclosed in U.S. Pat. No. 5,110,666 to Menzel et al. (herein incorporated by reference) permits low add on weights reported to be in the range of 0.1 to 1 ounces per square yard but the material itself is relatively expensive and is believed to require relatively complex compounding and application procedures due to the nature of the coating materials. Patentees, however, fail to disclose any pertinent elasticity and/or tensile strength characteristics of their particular polyurethane coating materials. Furthermore, there is no discussion pertaining to the importance of the coating ability (and thus correlated low air permeability) at low add-on weights of such polyurethane materials on side curtain airbags only for fabrics which are utilized within driver or passenger side cushions. All airbags must be inflatable extremely quickly; upon sensing a collision, in fact, airbags usually reach peak pressures within 10 to 20 milliseconds. Regular driver side and passenger side air bags are designed to withstand this enormous inflation pressure; however, they also deflate very quickly in order to effectively absorb the energy from the vehicle occupant hitting the bag. Such driver and passenger side cushions (airbags) are thus made from low permeability fabric, but they also deflate quickly at connecting seams (which are not coated to prevent air leakage) or through vent holes. Furthermore, the low add-on coatings taught within Menzel, and within U.S. Pat. No. 5,945,186 to Li et al., would not provide long-term gas retention; they would actually not withstand the prolonged and continuous pressures supplied by activated inflators for more than about 2 seconds, at the most. The low permeability of these airbag fabrics thus aid in providing a small degree of sustained gas retention within driver and passenger airbag cushions to provide the deflating cushioning effects necessary for sufficient collision protection. Such airbag fabrics would not function well as side curtain airbags, since, at the very least, the connecting seams which create the pillowed, cushioned structures within such airbags, as discussed in greater detail below, would not be coated. As these areas provide the greatest degree of leakage during and after inflation, the aforementioned patented low-coating low-permeability airbag fabrics would not be properly utilized within side curtain airbags. Lastly, polyurethanes suffer from aging and durability problems which requires complexities of mixing and application to overcome such difficulties.

As alluded to above, there are three primary types of different airbags, each for different end uses. For example, driver-side airbags are generally mounted within steering columns and exhibit relatively high air permeabilities in order to act more as a cushion for the driver upon impact. Passenger-side airbags also comprise relatively high air permeability fabrics which permit release of gas either therethrough or through vents integrated therein. Both of these types of airbags are designed to protect persons in sudden collisions and generally burst out of packing modules from either a steering column or dashboard (and thus have multiple "sides"). Side curtain airbags, however, have been designed primarily to protect passengers during rollover crashes by retaining its inflation state for a long duration (for example, exhibiting a retention of at least 50% of the initial pressure after 5 seconds subsequent to high pressure inflation) and generally unroll from packing containers stored within the roofline along the side windows of an automobile (and thus have a back and front side only). Side curtain airbags therefore not only provide cushioning effects but also provide protection from broken glass and other debris. As such, it is imperative that side curtain airbags, as noted above, retain large amounts of gas, as well as high gas pressures, to remain inflated throughout the longer time periods of the entire potential rollover situation. To accomplish this, these side curtains are generally coated with very large amounts of silicone sealing materials on both the front and back sides. Since most side curtain airbag fabrics comprise woven blanks that are sewn, sealed, or integrally woven together, discrete areas of potentially high leakage of gas are prevalent, particularly at and around the seams. It has been accepted as a requirement that heavy coatings were necessary to provide the low permeability (and thus longer leak-down time) necessary for side curtain airbags. Without such heavy coatings, such airbags would most likely deflate too quickly and thus would not function properly during a rollover collision. As will be well understood by one of ordinary skill in this art, such heavy coatings add great cost to the overall manufacture of the target side curtain airbags. There is thus a great need to manufacture low permeability side curtain airbags with less expensive (preferably lower coating add-on weight) coatings without losing the aging, humidity, and permeability characteristics necessary for proper functioning upon deployment. To date, there has been little accomplished, if anything at all, alleviating the need for such thick and heavy airbag coatings from side curtain airbags. Furthermore, since silicones (i.e., polyorganosiloxanes and the like) provide the best overall aging stability and durability performance as airbag coatings, there is a desire to utilize such beneficial types of materials for low permeability airbags. Unfortunately, to date the only teachings regarding such silicone-based materials concern extremely thick, and thus costly and difficult to handle and apply, coating formulations. A need thus exists to provide lower add-on weights for silicone-based airbag coating compositions, but with the same aging, durability, and low permeability performance characteristics.

Furthermore, there is a current drive to store such low permeability side curtain airbags within cylindrically shaped modules. Since these airbags are generally stored within the rooflines of automobiles, and the area available is quite limited, there is always a great need to restrict the packing volume of such restraint cushions to their absolute minimum. However, the previously practiced low permeability side curtain airbags have proven to be very cumbersome to store in such cylindrically shaped containers at the target automobile's roofline. The actual time and energy required to roll such heavily coated low permeability articles as well as the packing volume itself, has been very difficult to reduce. Furthermore, with such heavy coatings utilized, the problems of blocking (i.e., adhering together of the different coated portions of the cushion) are amplified when such articles are so closely packed together. The chances of delayed unrolling during inflation are raised when the potential for blocking is present. Thus, a very closely packed, low packing volume, low blocking low permeability side curtain airbag is highly desirable. Unfortunately, the prior art has again not accorded such an advancement to the airbag industry.

OBJECTS AND BRIEF DESCRIPTION OF THE INVENTION

In light of the background above, it can be readily seen that there exists a need for a low permeability, side curtain airbag that utilizes lower, and thus less expensive, amounts of durable, silicone-based coatings exhibiting good aging characteristics, and therefore exhibit a substantially reduced packing volume over the standard low permeability type side curtain airbags. Such a coated low permeability airbag must provide a necessarily high leak-down time upon inflation and after long-term storage. Such a novel airbag and a novel coating formulation provides marked improvements over the more expensive, much higher add-on airbag coatings (and resultant airbag articles) utilized in the past.

It is therefore an object of this invention to provide a coated airbag, wherein the coating comprises a majority (at least) of silicone materials, is present in a very low add-on weight, and possesses extremely high leak-down time characteristics after inflation and thus complementary low permeability characteristics. Another object of the invention is to provide an inexpensive side curtain airbag cushion. A further object of this invention is to provide an highly effective airbag coating formulation which may be applied in very low add-on amounts to obtain extremely low permeability airbag structures after inflation. An additional object of this invention is to provide an airbag coating formulation which not only provides beneficial and long-term low permeability, but also exhibits excellent long-term storage stability (through heat aging and humidity aging testing).

Accordingly, this invention is directed to an airbag cushion comprising a coated fabric, wherein said fabric is coated with an elastomeric composition in an amount of at most about 3.0 ounces per square yard, preferably, at most about 2.5 ounces per square yard of the fabric; wherein said elastomeric composition comprises at least 50% by weight of the entire composition of silicone-based materials; and wherein said airbag cushion, after long-term storage, exhibits a characteristic leak-down rate of at least half of its initial inflation pressure (and thus upon retention of at least half of the inflation gas itself) of at least 5 seconds, preferably higher than 10, and most preferably higher than 50. Also, this invention concerns an airbag cushion comprising a coated fabric, wherein said fabric is coated with an elastomeric composition comprising at least 50% by weight of the entire composition of solvent-based silicone materials comprising from 10 to 90% solids content; and wherein said airbag cushion, after long-term storage, exhibits a characteristic leak-down rate of at least half of its initial inflation pressure (and thus upon retention of at least half of the inflation gas itself) of at least 5 seconds.

The term "characteristic leak-down rate" is intended to encompass the measurement of time required for the pressure within a target coated airbag to be reduced from an inflation pressure to half of its initial inflation pressure, for example from about 30 psi to 15 psi, or from about 15 to about 7 psi, due to escape of inflation gas through openings within the airbag and within the coating which develop upon exposure to such high pressures. Thus, this measurement begins the instant after peak initial pressure is reached upon inflation (such as, traditionally, about 30 psi, or as low as 7 psi) with a standard inflation module which continues to pump gas into the target airbag during and after peak initial pressure is reached. It is well understood that the pressure of gas forced into the airbag after peak initial pressure is reached will not remain stable (it decreases during the subsequent introduction of inflation gas), and that the target airbag will inevitably permit escape of a certain amount of inflation gas during that time. The primary focus of such side curtain airbags (as noted above) is to remain inflated for as long as possible in order to provide sufficient cushioning protection to vehicle occupants during rollover accidents. The greater amount of gas retained, the better cushioning effects are provided the passengers. Thus, the longer the airbag retains a large amount of inflation gas, and consequently the greater the characteristic leak-down time, the better cushioning results are achieved. At the very least, the inventive airbag must retain at least half of its inflated gas volume 7 seconds subsequent to reaching peak initial pressure.

In an alternative, such a term is also intended to encompass the measurement of time required for the entire amount of inflation gas introduced within an already-inflated (to a peak initial pressure which "opens" up the areas of weak sealing) and deflated airbag cushion upon subsequent re-inflation at a constant pressure at 10 psi. It is well known and well understood within the airbag art, and particularly concerning side curtain (low permeability) airbag cushions, that retention of inflation gas for long periods of time is of utmost importance during a collision. Side curtain airbags are designed to inflate as quickly as driver- and passenger-side bags, but they must deflate very slowly to protect the occupants during roll over and side impact. Thus, it is imperative that the bag exhibit a very low leakage rate after the bag experiences peak pressure during the instantaneous, quick inflation. Hence, the coating on the bag must be strong enough to withstand the shock and stresses when the bag is inflated so quickly. Thus, a high characteristic leak-down time measurement is paramount in order to retain the maximum amount of beneficial cushioning gas within the inflated airbag. Airbag leakage after inflation (and after peak pressure is reached) is therefore closely related to actual pressure retention characteristics. The pressure retention characteristics (hereinafter referred to as "leak-down time") of already-inflated and deflated side curtain airbags can be described by a characteristic leak-down time t, wherein:

$$t \text{ (second)} = \frac{\text{Bag volume(ft}^3)}{\text{Volumetric leakage rate (SCFM}*) \text{ at 10 Psi}} \times 60$$

*SCFM: standard cubic feet per minute.

It is understood that the 10 psi constant is not a limitation to the invention; but merely the constant pressure at which certain leak-down time measurements can be made. Thus, even if the pressure is above or below this amount during actual inflation or after initial pressurizing of the airbag, the only limitation is that if one of ordinary skill in the art were to measure the bag volume and divide that by the volumetric leakage rate time (measured by the amount leaking out of the target airbag during steady state inflation at 10 psi), the resultant measurement in time would be at least 10 seconds at a coating add-on weight of about 1.5 ounces per square yard. Preferably, this time is greater than about 10 seconds; more preferably, greater than about 20 seconds; still more preferably in excess of about 40 seconds; and most preferably, greater than about 50 seconds.

Likewise, the term, "after long-term storage" encompasses either the actual storage of an inventive airbag cushion within an inflator assembly (module) within an automobile, and/or in a storage facility awaiting installation. Such a measurement is generally accepted, and is well understood and appreciated by the ordinarily skilled artisan, to be made through comparable analysis after representative heat and humidity aging tests. These tests generally involve 120° C. oven aging for 14 days, or, alternatively, but comparably, oven aging at 80° C. and 95% relative humidity aging for 14 days. Such tests are universally accepted as proper estimations of the conditions of long-term storage for airbag cushions. Thus, this term encompasses such measurement tests. The inventive airbag fabrics must exhibit proper characteristic leak-down times after undergoing such rigorous pseudo-storage testing.

The inventive coating composition must comprise at least 50% by weight of at least one silicone-based elastomer and such a composition may only be present on the target airbag surface in an amount of at most 3.0 ounces per square yard of fabric. Preferably, this amount ranges from about 0.5 to about 2.5 ounces per square more preferably from about 1.0 to about 2.0; and most preferably from about 1.5 to about 2.0. Furthermore, the silicone-based elastomer preferably comprises at least 60% by weight of the entire composition, more preferably at least about 75%, yet more preferably at least 90%, and most preferably, at least 95 up to 100%.

The term silicone-based materials or elastomers is intended to encompass any compound comprising silicone bonded with at least one oxygen atom (such as, for example, polyorganosiloxanes). Preferred compounds of this type are listed below.

It is this high amount of silicone-based materials with a correspondingly low add-on weight and resultant high leak-down time (provided for the target airbag fabric) which is of greatest importance and which is so highly unexpected within this invention. As noted above, the utilization of silicone-based materials has been of great desire within low-permeability airbag articles; however, due to low elongation and tensile strength characteristics, the coatings required to provide the desired low permeability measurements were too thick (and too expensive) to provide a viable coating within the industry. The ability to provide silicone-based coatings with substantially uniform coating thicknesses (with extremely low thickness variations) has created the opportunity now to utilize the desired silicones as the prominent coating materials within these specific low-permeability applications.

Thus, the silicones within the inventive coatings are preferably solvent-based and exhibit a solids content of between about 10 and 90% of the total silicone composition. Preferably, this amount is from about 20 to about 80%; more preferably from about 30 to about 75%; and most preferably from about 35 to about 65%. The solids content permits greater control of application on the target fabric surface. Generally, a dry coating is ineffective and an overly liquid composition (although easier to handle on an industrial scale initially) effectively prevents a low variation (in terms of thickness) coating to be applied over the target fabric surface. It has now been found that silicone-based materials will provide the desired high elongation at break and tensile strength characteristics if the coating applied to the target fabric surface does indeed exhibit a substantially uniform thickness. Since the coating must fill the interstitial spaces between yarns and seams, the more uneven the coating in such discrete areas, the easier it is to displace it. A more balanced, and thus stronger, coating, thus provides the needed ability to retain the greatest amount of coating over its applied area during an inflation event for the longest amount of time. Thus, the specific silicone-based coating composition herein dicussed must be in contact with the target fabric surface. It may be treated with other materials to aid in blocking reduction (i.e., adhesion between folded portions of coated fabric), greater aging stability, and moisture resistance, if desired.

In the past, knife coating (including knife-over-gap) was the primary method of applying silicone-based materials to airbag surfaces. However, due to the physical state of such traditional materials (i.e., low solids content), the applied coating was extremely difficult to apply in a uniform fashion (with respect to coating thickness). It has now been found that the utilization of the higher solids content silicone-based materials noted above, the application method may be followed with, for example, a wider gap during the knife coating, permitting greater control (and less "smearing") of the applied coating to effectuate the desired substantially uniform, low add-on, level.

Hence, with a substantially uniform, low add-on thickness, the silicone-based coating exhibits the desired high levels of tensile strength of at least 1,000 psi (preferably, at least 1,100, more preferably at least 1,200, and most preferably at least 1,250) and an elongation to break of greater than about 200% (preferably in excess of about 300%, more preferably greater than 500%, and most preferably greater than about 600%). These characteristics of the elastomer translate to a coating that is both very strong (and thus will withstand enormous pressures both at inflation and during the time after inflation and will not easily break) and can stretch to compensate for such large inflation, etc., pressures. Thus, when applied at the seams of a side curtain airbag, as well as over the rest of the airbag structure, the coating will most preferably (though not necessarily) form a continuous film. This coating acts to both fill the individual holes between the woven yarns and/or stitches, etc., as well as to "cement" the individual yarns in place. During inflation, then, the coating prevents leakage through the interstitial spaces between the yarns and aids in preventing yarn shifting (which may create larger spaces for possible gas escape).

Synergistically, the availability of such high tensile strength and high elongation at break silicone-based materials permits the consequent utilization, surprisingly, of extremely low add-on weight amounts of such highly desirable coating formulations (as noted previously). Normally, the required coatings on side curtain airbags are very high, at least 3.0 ounces per square yard (with the standard actually much higher than that, at about 4.0). The inventive airbag cushions require much less coating amounts (in terms of add-on weights on the target fabric) to achieve the desired leak down rate. The inventive coatings are present preferably in an amount of about at most 3.0 (preferably less, such as 2.0, more preferably 1.8, still more preferably, about 1.5, and most preferably, as low as 0.8) ounces per square yard to effectuate the desired high leak-down (low permeability). Furthermore, such silicone-based coatings exhibit excellent heat and humidity aging stability. Thus, the coating compositions and coated airbags are clearly improvements within this specific airbag art.

Examples of silicone-based materials and/or elastomers acceptable for utilization within this invention by exhibiting the proper ability to form a substantially uniformly thick permeability controlling coating on a target airbag fabric surface include such beneficial solids content compositions as RHODIA® HS-60, available from Rhodia, Inc. and possessing a solids content of about 50%, and Dow-Coming TR-55 silicones exhibiting solids content measurements of about 30%, both in relation to the total solvent-based compositions. The solvents present within the potential high solids content compositions may be any standard organic liquid solvents, such as lower alcohols (isopropanol, ethanol, butanol, and the like), aromatic liquids, such as toluene, aniline, and the like, methyl ethyl ketone, and any other such standard solvents.

Other possible components present within the elastomer coating composition are viscosity modifying agents, antioxidants, flame retardants, coalescent agents, adhesion promoters, and colorants.

Primer adhesives may be utilized to facilitate adhesion between the surface of the target fabric and the elastomer itself. Thus, although it is preferable for the elastomer to be the sole component of the entire elastomer composition in contact with the fabric surface, it is possible to utilize adhesion promoters, such as isocyanates, epoxies, functional silanes, and other such resins with adhesive properties, without deleteriously effecting the ability of the elastomer to provide the desired low permeability for the target airbag cushion. An overtreatment component, as noted above, may also be utilized to effectuate proper non-blocking characteristics to the target airbag cushion. Such a treatment may perform various functions, including, but not limited to, improving aging of the elastomer (such as with silicone) or providing blocking resistance due to the adhesive nature of the coating materials.

Airbag fabrics must pass certain tests in order to be utilized within restraint systems. One such test is called a blocking test which indicates the force required to separate two portions of coated fabric from one another after prolonged storage in contact with each other (such as an airbag is stored). Laboratory analysis for blocking entails pressing together coated sides of two 2 inch by 2 inch swatches of airbag fabric at 5 psi at 100° C. for 7 days. If the force required to pull the two swatches apart after this time is greater than 50 grams, or the time required to separate the fabrics utilizing a 50 gram weight suspended from the bottom fabric layer is greater than 10 seconds, the coating fails the blocking test. Clearly, the lower the required separating shear force, the more favorable the coating. For improved blocking resistance (and thus the reduced chance of improper adhesion between the packed fabric portions), topcoat components may be utilized, such as talc, silica, silicate clays, and starch powders, as long as the add-on weight of the entire elastomer composition (including the topcoat) does not exceed about 3.0 ounces per square yard, preferably about 3.0 ounces per square yard (and preferably exists at a much lower level, about 2.0, for instance). Preferably, talc is the utilized topcoat (if one is present at all). Other potential topcoats (though much less desired) include, polyamides, NBR rubbers, EPDM rubbers, and the like, as long as the elastomer composition (including the topcoat) does not exceed the 3.0 ounces per square yard of the add-on weight to the target fabric.

Two other tests which the specific coated airbag cushion must pass are the oven (heat) aging and humidity aging tests. Such tests also simulate the storage of an airbag fabric over a long period of time upon exposure at high temperatures and at relatively high humidities. These tests are actually used to analyze alterations of various different fabric properties after such a prolonged storage in a hot ventilated oven (>100° C.) (with or without humid conditions) for 2 or more weeks. For the purposes of this invention, this test was used basically to analyze the air permeability of the coated side curtain airbag by measuring the characteristic leak-down time (as discussed above, in detail). The initially produced and stored inventive airbag cushion should exhibit a characteristic leak-down rate of half of its initial inflation pressure of at least 5 seconds, and preferably much higher. Alternatively, a characteristic leak-down time of greater than about 5 seconds (upon re-inflation at 10 psi gas pressure after the bag had previously been inflated to a peak pressure above about 15 psi and allowed to fully deflate) under such harsh storage conditions. Other additives may be present within the elastomer composition, including, and not limited to, UV stabilizers, fillers, pigments, and crosslinking/curing agents, as are well known within this art.

The substrate to which the inventive high solids content silicone-based elastomeric coatings are applied to form the airbag base fabric in accordance with the present invention is preferably a woven fabric formed from yarns comprising synthetic fibers, such as polyamides or polyesters. Such yarn preferably has a linear density of about 105 denier to about 840 denier, more preferably from about 210 to about 630 denier, and most preferably from about 315 to about 420 denier. Such yarns are preferably formed from multiple filaments wherein the filaments have linear densities of about 6 denier per filaments or less and most preferably about 4 denier per filament or less. In the more preferred embodiment such substrate fabric will be formed from fibers of nylon, and most preferred is nylon 6,6. It has been found that such polyamide materials exhibit particularly good adhesion and maintenance of resistance to hydrolysis when used in combination with the coating according to the present invention. Such substrate fabrics are preferably woven using fluid jet weaving machines as disclosed in U.S. Pat. Nos. 5,503,197 and 5,421,378 to Bower et al. (incorporated herein by reference). Such woven fabric will be hereinafter referred to as an airbag base fabric. As noted above, the inventive airbag must exhibit extremely low permeability and thus must be what is termed a "side curtain" airbag. As noted previously and extensively, such side curtain airbags (a.k.a., cushions) must retain a large amount of inflation gas during a collision in order to accord proper long-duration cushioning protection to passengers during rollover accidents. Any standard side curtain airbag may be utilized in combination with the low add-on coating to provide a product which exhibits the desired leak-down times as noted above. Most side curtain airbags are produced through labor-intensive sewing or stitching (or other manner) together two separate woven fabric blanks to form an inflatable structure. Furthermore, as is well understood by the ordinarily skilled artisan, such sewing, etc., is performed in strategic locations to form seams (connection points between fabric layers) which in turn produce discrete open areas into which inflation gasses may flow during inflation. Such open areas thus produce pillowed structures within the final inflated airbag cushion to provide more surface area during a collision, as well as provide strength to the bag itself in order to withstand the very high initial inflation pressures (and thus not explode during such an inflation event). Other side curtain airbag cushions exist which are of the one-piece woven variety. Basically, some inflatable airbags are produced through the simultaneous weaving of two separate layers of fabric which are joined together at certain strategic locations (again, to form the desired pillowed structures). Such cushions thus present seams of connection between the two layers. It is the presence of so many seams (in both multiple-piece and one-piece woven bags) which create the aforementioned problems of gas loss during and after inflation. The possibility of yarn shifting, particularly where the yarns shift in and at many different ways and amounts, thus creates the quick deflation of the bag through quick escaping of inflation gasses. Thus, the base airbag fabrics do not provide much help in reducing permeability (and correlated leak-down times, particularly at relatively high pressures). It is this seam problem which has primarily created the need for the utilization of very thick, and thus expensive, coatings to provide necessarily low permeability in the past.

Recently, a move has been made away from both the multiple-piece side curtain airbags (which require great amounts of labor-intensive sewing to attached woven fabric blanks) and the traditionally produced one-piece woven cushions, to more specific one-piece woven fabrics which exhibit substantially reduced floats between woven yarns to substantially reduce the unbalanced shifting of yarns upon inflation, such as in Ser. No. 09/406,264, to Sollars, Jr., now U.S. Pat. No. 6,220,309, the specification of which is completely incorporated herein. These one-piece woven bags are generally produced on dobby or jacquard fluid-jet looms, preferably the utilized one-piece airbag is made from a jacquard weaving process. With such an improvement, the possibility of high leakage at the seams is substantially reduced. These airbags provide balanced weave constructions at and around attachment points between two layers of fabrics such that the ability of the yarns to become displaced upon inflation at high pressures is reduced as compared with the standard one-piece woven airbags (basically, the floats within the woven seams forming the inflation chambers of such cushions number at most 3 picks in order to provide such desired low permeability characteristics). Unfortunately, such inventive one-piece woven bags are still problematic in that the weave intersections may be displaced upon high pressure inflation such that leakage will still most likely occur at too high a rate for proper functioning. As a result, there is still a need to coat such one-piece woven structures with materials which reduce and/or eliminate such an effect. However, such one-piece woven structures permit extremely low add-on amounts of elastomeric coatings for low permeability effects. In fact, these inventive airbags function extremely well with low add-on coatings below 2.0 and as low as about 1.0 ounces per square yard.

Furthermore, although it is not preferred in this invention, it has been found that the inventive coating composition provides similar low permeability benefits to standard one-piece woven airbags, particularly with the inventive low add-on amounts of high tensile strength, high elongation, silicone-based elastomer materials; however, the amount of coating required to permit high leak-down times is much higher than for the aforementioned Sollars, Jr. inventive one-piece woven structure. Thus, add-on amounts of as much as 1.5 and even up to about 2.5 ounces per square yard may be necessary to effectuate the desired low level of air permeability for these other one-piece woven airbags. Even with such higher add-on coatings, the inventive coatings themselves clearly provide a marked improvement over the standard, commercial, prior art silicone, etc., coatings (which must be present in amounts in excess of 3.0 ounces per square yard).

Additionally, it has also been found that the inventive coating compositions, at the inventive add-on amounts, etc., provide the same types of benefits with the aforementioned sewn, stitched, etc., side curtain airbags. Although such structures are highly undesirable due to the high potential for leakage at these attachment seams, it has been found that the inventive coating provides a substantial reduction in permeability with correlative lower add-on amounts than with standard low permeability, high add-on silicone and neoprene rubber coating formulations. Such add-on amounts for the inventive coatings will approach the 3.0 ounces per square yard, but lower amounts have proven effective (lower than 2.5, lower than 2.0, and most preferably less than about 1.5 ounces per square yard, for example) depending on the utilization of a sufficiently high tensile strength and sufficiently stretchable elastomeric component within the coating composition directly in contact with the target fabric surface. Again, with the ability to reduce the amount of coating materials (which are generally always quite expensive), while simultaneously providing a substantial reduction in permeability to the target airbag structure, as well as high resistance to humidity and extremely effective aging stability, the inventive coating composition, and the inventive coated airbag itself is clearly a vast improvement over the prior airbag coating art.

Of particular importance within this invention is the ability to pack the coated airbag cushions within cylindrical storage containers at the roof line of a target automobile in as small a volume as possible. In a rolled configuration (in order to best fit within the cylindrical container itself, and thus in order to best inflate upon a collision event downward to accord the passengers sufficient protection), the inventive airbag may be constricted to a cylindrical shape having a diameter of at most 23 millimeters. In such an instance, with a 2 meter long cylindrical roofline storage container, the necessary volume of such a container would equal about 830 $cm^3$.(with the volume calculated as $2[Pi]radius^2$) Standard rolled packing diameters are at least 25 millimeters for commercially available side curtain airbag cushions (due to the thickness of the required coating to provide low permeability characteristics). Thus, the required cylindrical container volume would be at least 980 $cm^3$. Preferably, the rolled diameter of the inventive airbag cushion during storage is at most 20 millimeters (giving a packed volume of about 628 $cm^3$) which is clearly well below the standard packing volume. In relation, then, to the depth of the airbag cushion upon inflation (i.e., the length the airbag extends from the roofline down to its lowest point along the side of the target automobile, such as at the windows), the quotient of the inventive airbag cushion's depth (which is standard at approximately 17 inches or 431.8 millimeters) to its rolled packed diameter should be at least about 18.8. Preferably this quotient should be about 21.6 (20 millimeter diameter), and, at its maximum, should be about 24 (with a minimum diameter of about 18 millimeters). Of course, this range of quotients does not require the depth to be at a standard of 17 inches, and is primarily a function of coating thickness, and thus add-on weight.

The inventive coatings are preferably knife-over-gap coated across the fabric substrate and dried and cured to form the necessarily thin, substantially uniform coating. Other controlled thickness coating methods can be utilized, including, without limitation, floating knife, and knife-over-foam pad methods, to name a few different method types. Particularly preferred, however, is fixed-gap knife coating in order to provide a uniform coating (or possibly film) on the target fabric surface. A fixed-gap coating procedure which permits even coating over the raised yarns of the target fabric is highly desired. The final dry weight of the coating is preferably from about 0.5–3.0, more preferably from 1.0–2.5 ounces per square yard or less and most preferably 1.5–2.25 ounces per square yard or less. The resultant airbag cushion is substantially impermeable to air when measured according to ASTM Test D737, "Air Permeability of Textile Fabrics," standards.

While the invention will be described and disclosed in connection with certain preferred embodiments and practices, it is in no way intended to limit the invention to those specific embodiments, rather it is intended to cover equivalent structures structural equivalents and all alternative embodiments and modifications as may be defined by the scope of the appended claims and equivalence thereto.

PREFERRED EMBODIMENTS OF THE INVENTION

In order to further describe the present invention the following nonlimiting examples are set forth. These examples are provided for the sole purpose of illustrating some preferred embodiments of the invention and are not to be construed as limiting the scope of the invention in any manner.

Some other silicone-based elastomers potentially preferred within this invention include:

TABLE 1

Other Preferred Silicone-Based Coating Materials

| Commercial name | Tensile Strength | Elongation at Break | Tear Strength | Spec. Gravity |
| --- | --- | --- | --- | --- |
| Rhodia ® 50042 | 800 psi | 920% | 125 ppi | 1.12 |
| Rhodia ® 50065 | 1100 psi | 1000% | 200 ppi | 1.12 |
| Rhodia ® 50066 | 1100 psi | 900% | 220 ppi | 1.13 |
| Rhodia ® 50067 | 1100 psi | 700% | 270 ppi | 1.14 |
| Rhodia ® 50069 | 1150 psi | 700% | 290 ppi | 1.14 |
| Rhodia ® 50081 | 1250 psi | 700% | 300 ppi | 1.15 |
| Rhodia ® 50071 | 1000 psi | 450% | 200 ppi | 1.18 |
| Dow Corning ® 4-7224 | 1220 psi | 744% | 80 ppi | * |
| Dow Corning ® 94-595 | 1600 psi | 600% | 80 ppi | * |
| Dow Corning ® TR-55 | 1488 psi | 791% | 24 ppi | * |

*No Specific Gravity measurements were available for the Dow Corning Silicone materials.

Specific compounding and application to target fabric of the inventive silicone-based materials was undertaken as follows:

EXAMPLE 1

The following coating formulation was first compounded:

| Component | Amount |
| --- | --- |
| Rhodia ® HS-60 Part A Silicone | 50 parts |
| Rhodia ® HS-60 Part B Silicone | 50 parts |
| Toluene | 100 parts |

This formulation was prepared and applied to a one-piece woven side-curtain airbag made from 420 denier nylon 6,6 yarns and including woven-in seams exhibiting no more than 3 sequential floats per pick (in accordance with the preferred bag within U.S. patent application No. 09/406,264, to Sollars, Jr., now U.S. Pat. No. 6,220,309).

The solvent dispersion was applied to the bag with a knife over roll coating method. The coating gap of 825 microns was used in order to target a coating add-on of 2.0 oz/yd. The solvent was removed in the drying oven and the fabric cured 180®C for 2 minutes followed by a post cure of 7 minutes in a separate oven to ensure optimum cure. The actual coating add-on was determined to be 1.78 oz/yd².

The test bag was then tested on a high pressure permeability tester by incrementally increasing the pressure up to a maximum of 15 psi. The flow rates observed were as follows:

| psi | flow (scfm) |
|---|---|
| 2.5 | 0.00 |
| 5.0 | 0.07 |
| 7.5 | 0.09 |
| 10.0 | 0.13 |
| 12.5 | 0.17 |
| 15.0 | 0.28 |

After reaching 15 psi, the air supply valve was closed and the amount of time to drop from the peak pressure of 15 psi to a pressure of 7 psi was determined to be 33 seconds.

EXAMPLES 2–4

The same coating formulation in EXAMPLE 1, above, was applied to three separate one-piece woven airbags (as above), but in different fabric add-on weights. EXAMPLE 2 was applied in an amount of about 2.25 ounces per square yard; EXAMPLE 3, about 1.90; and EXAMPLE 4 about 1.56. The results for each (leak-down rate) is tabulated below with a final notation showing the actual time required for the inventive airbags to lose inflation pressure to about half of its initial level.

(not illustrated). Also present within the roofline 20 is an inflator assembly 24 which ignites and forces gas into the side curtain airbag (26 of FIG. 2) upon a collision event.

FIG. 2 shows the inflated side curtain airbag 26. As noted above, the airbag 26 is coated with at most 2.5 ounces per square of a coating formulation (not illustrated), preferably the composition of EXAMPLE 1, above. The inventive airbag 26 will remain sufficiently inflated for at least 5 seconds, and preferably more, such as from at least 20 to at least 50 seconds, most preferably.

FIG. 3 shows the side curtain airbag 26 prior to storage in its uninflated state within the roofline cylindrically shaped container 22. The thickness of the airbag 26, measured as the rolled packing diameter (as in FIG. 5, below) as compared with the depth of the airbag measured from the roofline cylindrically shaped container 22 to the bottom most point 28 of the airbag 26 either in its uninflated or inflated state will be at least 17 and at most 29, as noted above.

FIGS. 4 and 5 aid in understanding this concept through the viewing of the rolled airbag 26 as stored within the container 22 along line 2. The diameter measurement of the airbag 26 of Example 3, above, is roughly 20 millimeters. The standard depth of side curtain airbags is roughly 17 inches, or about 431.8 millimeters. Thus, the preferred packing volume factor is about 21.6. A comparative silicone-based thick coating add-on weight of about 4.0 ounces per square yard provided a diameter of about 25 millimeters for a factor of about 17.3.

There are, of course, many alternative embodiments and modifications of the present invention which are intended to be included within the spirit and scope of the following claims.

| | Leak-Down Rate (SCFM at indicated pressure) | | | | | | | Leak-Down Time |
|---|---|---|---|---|---|---|---|---|
| EXAMPLE | 10 kPa | 20 kPA | 30 pKa | 40 pKa | 50 pKa | 60 pKa | 70 pKa | (secs.) from 70 to 40 kPa |
| 2 | 0.0 | 0.0 | 0.09 | 0.09 | 0.13 | 0.13 | 0.22 | 163 |
| 3 | 0.0 | 0.0 | 0.07 | 0.11 | 0.15 | 0.24 | 0.42 | 52 |
| 4 | 0.0 | 0.5 | 0.11 | 0.16 | 0.28 | 0.46 | 0.78 | 25 |

Thus, the inventive low add-on silicone-based coatings provided excellent long-term low permeability to the target airbags.

DESCRIPTION OF THE DRAWINGS

FIG. 1 depicts the side, inside view of a vehicle prior to deployment of the inventive side curtain airbag.

FIG. 2 depicts the side, inside view of a vehicle after deployment of the inventive side curtain airbag.

FIG. 3 depicts a side view of a side curtain airbag.

FIG. 4 provides a side view of a side curtain airbag container.

FIG. 5 provides a cross-sectional perspective of the stored airbag within the container of FIG. 4.

DETAILED DESCRIPTION OF THE DRAWINGS

As depicted in FIG. 1, an interior of a vehicle 10 prior to inflation of a side curtain airbag (not illustrated) is shown. The vehicle 10 includes a front seat 12 and a back seat 14, a front side window 16 and a back-side window 18, a roofline 20, within which is stored a cylindrically shaped container 22 comprising the inventive side curtain airbag

What is claimed is:

1. A side-curtain airbag cushion designed to stay inflated during a rollover situation, said cushion comprising a coated fabric wherein said fabric is coated with a single coating layer comprising a silicone-based elastomeric composition in an amount of at most about 3.0 ounces per square yard; wherein said coating layer comprises at least 50% by weight of the entire composition of said silicone-based elastomeric composition; wherein said silicone-based elastomeric composition simultaneously exhibits, by itself, a tensile strength of at least 800 psi, an elongation at break of at least 450%, and a tear strength of at least 125 ppi; wherein said silicone-based elastomeric composition is in contact with the surface of said airbag fabric; and wherein said airbag cushion, alter long-term storage, exhibits a characteristic leak-down rate of at least half of its initial inflation pressure of at least 5 seconds.

2. The airbag cushion of claim 1 wherein said coated fabric comprises fibers selected from the group consisting of polyester and polyamide.

3. The airbag cushion of claim 2 wherein said coated fabric comprises polyamide fibers selected from the group consisting of nylon 6 and nylon 6,6.

4. The airbag cushion of claim 2 wherein said fibers exhibit a denier in the range of from 315 to about 630.

5. The airbag cushion of claim 4 wherein said fibers exhibit a denier of about 420.

6. The airbag cushion of claim 5 wherein said fibers are polyamide fibers selected from the group consisting of nylon 6 and nylon 6,6.

7. The airbag cushion of claim 6 wherein said coating layer comprises at least 60% by weight of the total coating layer of said silicone-based elastomeric composition and is present on said airbag fabric in an amount of from about 0.5 to about 2.5 ounces per square yard of fabric.

8. The airbag cushion of claim 7 wherein said coating layer comprises at least 75% by weight of the total composition of said silicone-based elastomeric composition and is present on said airbag fabric in an amount of from about 0.75 to about 2.25 ounces per square yard of fabric.

9. The airbag cushion of claim 1 wherein the characteristic leak-down rate is at least 10 seconds.

10. The airbag cushion of claim 9 wherein the characteristic leak-down rate is at least 20 seconds.

11. The airbag cushion of claim 10 wherein the characteristic leak-down rate is at least 30 seconds.

12. The airbag cushion of claim 11 wherein the characteristic leak-down rate is at least 50 seconds.

13. The airbag cushion of claim 1 said cushion is a one-piece jacquard woven side-curtain airbag exhibiting floats of at most 3 picks present within each seam surrounding the inflated chamber.

14. A side-curtain airbag cushion designed to stay inflated during a rollover situation, said cushion comprising a coated fabric wherein said fabric is coated with a single coating layer comprising a solvent-based silicone composition comprising from 10 to 90% solids content in an amount of at most about 3.0 ounces per square yard; wherein said coating layer comprises at least 50% by weight of the entire composition of said silicone composition; wherein said silicone composition exhibits, by itself, a tensile strength of at least 800 psi, an elongation at break of at least 450%, and a tear strength of at least 125 ppi; and wherein said airbag cushion, after long-term storage, exhibits a characteristic leak-down rate to at least half of its initial inflation pressure of at least about 5 seconds.

15. The airbag cushion of claim 17 wherein said coated fabric comprises fibers selected from the group consisting of polyester and polyamide.

16. The airbag cushion of claim 15 wherein said coated fabric comprises polyamide fibers selected from the group consisting of nylon 6 and nylon 6,6.

17. The airbag cushion of claim 16 wherein said fibers exhibit a denier in the range of from 315 to about 630.

18. The airbag cushion of claim 17 wherein said fibers exhibit a denier of about 420.

19. The airbag cushion of claim 14 wherein said single coating layer comprises at least 60% by weight of the total composition of a solvent-based silicone composition and is present on said airbag fabric in an amount of from about 0.5 to about 2.5 ounces per square yard of fabric.

20. The airbag cushion of claim 19 wherein said single coating layer comprises at least 75% by weight of the total composition of a solvent-based silicone composition and is present on said airbag fabric in an amount of from about 0.75 to about 2.25 ounces per square yard of fabric.

21. The airbag cushion of claim 14 wherein the characteristic leak-down rate is at least 10 seconds.

22. The airbag cushion of claim 15 wherein the characteristic leak-down rate is at least 20 seconds.

23. The airbag cushion of claim 15 wherein the characteristic leak-down rate is at least 30 seconds.

24. The airbag cushion of claim 23 wherein the characteristic leak-down rate is at least 50 seconds.

25. The airbag cushion of claim 14 wherein said cushion is a one-piece jacquard woven side-curtain airbag exhibiting floats of at most 3 picks present within each seam surrounding the inflated chamber.

26. A coated woven side-curtain airbag exhibiting a rolled packing volume factor of from about 17 to about 24; wherein said coated woven side curtain airbag exhibits a leak-down time alter inflation of at least 5 seconds; wherein said coated woven side-curtain airbag is coated with a single coating layer comprising a silicone-based elastomeric composition; wherein said silicone-based elastomeric composition exhibits, by itself, a tensile strength of at least 800 psi, an elongation at break of at least 450%, and a tear strength of at least 125 ppi; and wherein said single coating layer comprises at least 50% by weight of solvent-based silicone materials.

27. The airbag cushion of claim 26 wherein said rolled packing volume factor is about 21.6.

* * * * *

UNITED STATES PATENT AND TRADEMARK OFFICE
CERTIFICATE OF CORRECTION

PATENT NO. : 6,734,124 B2
DATED : May 11, 2004
INVENTOR(S) : Hurst et al.

It is certified that error appears in the above-identified patent and that said Letters Patent is hereby corrected as shown below:

Column 14,
Line 56, after the word "cushion" delete the word "alter" and insert the word -- after --.

Column 15,
Line 24, after the word "claim 1" insert the word -- wherein --.

Column 16,
Line 32, after the word "time" delete the word "alter" and insert the word -- after --.

Signed and Sealed this

Thirtieth Day of November, 2004

JON W. DUDAS
*Director of the United States Patent and Trademark Office*